United States Patent [19]

Blake

[11] 4,161,362

[45] Jul. 17, 1979

[54] DOCUMENT CODING

[75] Inventor: Neil B. Blake, Harpenden, England

[73] Assignee: Rank Xerox Limited, London, England

[21] Appl. No.: 832,314

[22] Filed: Sep. 12, 1977

[30] Foreign Application Priority Data

Sep. 17, 1976 [GB] United Kingdom ............... 38622/76

[51] Int. Cl.2 ............................................... G03B 27/52

[52] U.S. Cl. ......................................... 355/40; 346/46; 355/64

[58] Field of Search ...................... 355/40, 64, 50, 133, 355/39, 4; 346/46; 270/12, 4, 18

[56] References Cited

U.S. PATENT DOCUMENTS

| | | | |
|---|---|---|---|
| 3,503,312 | 3/1970 | Allen et al. | 355/40 X |
| 3,739,698 | 6/1973 | DeVries | 355/64 X |

*Primary Examiner*—Richard A. Wintercorn

[57] ABSTRACT

Apparatus for selectively color marking successive copies produced in a copy machine to provide color-coded copies for routing or other identification purposes.

13 Claims, 5 Drawing Figures

DOCUMENT CODING

This invention relates to color coding of documents, particularly those generated in copying machines by recording information on sheet material.

Colored paper is used extensively for documents such as business forms to aid recognition, action and priority. Multiple-part document sets with individual colors assigned to each document of the set are well known. For example, an invoice may be generated on white paper with a blue copy to the packing department and a yellow copy to the accounts department.

In recent years the use of overlays with photocopiers has enabled users to simplify and streamline the generation of business forms. The advent of the automatic overlay device in which information from different sources is brought into predetermined juxtaposed position on an exposure platen of a photocopier to provide different originals to be copied has further increased this capability. However the production of color-coded forms using a conventional photocopier requires either that copy sheets of different colors stacked in the correct sequence be used or that a multiple tray paper feed system be provided. In both cases misfeeds will cause problems by upsetting the color sequence and a multi-tray system is an added expense.

It is therefor an object of the present invention to provide color-coding of docuemnts in a way which permits the production of color-coded documents in a copying machine from copy sheet stock of a single color.

To this end the invention provides, from one aspect, apparatus for color-coding documents including means for automatically marking successive documents serially presented thereto with mutually different colors in a preselected sequence. The documents in a series coded in such apparatus may thus be distinguished from one another by color. Each document in a series will usually have a color (or combination of colors) applied to it which is different from the colors or color combination applied to all the other documents in the series, although in some cases it may be desired that two or more documents in a series be colored in the same way.

The preselected sequence is preferably variable, for example by programming means incorporated in the apparatus.

In one form of the apparatus the documents are fed past the marking means which includes a plurality of marking devices operable in the preselected sequence.

Particularly where the document is fed therepast, the marking means preferably serves to mark a document with one or more colored stripes extending along an edge or edges of the document. Where the document is fed long edge first, each stripe is conveniently along a short edge of the document and for short edge feed, striping along the long edges is convenient.

The marking may be effected in various ways. In a preferred form colored marking material is sprayed onto the document. A spray head for each color may be provided or three spray guns each loaded with primary color dye may be operated singly and in combination to produce a range of colors.

Liquid marking materials may also be applied using rollers, impregnated felt pads, or brushes. For example, a brush or pad dipping in an inkwell may be lifted from the well by the document itself to apply a stripe to the document as it is fed past the brush or pad.

The document may also be color-coded by applying a recognition stripe electrographically using colored toner. Another possibility is to apply microspheres to the paper and crush them into the paper using a roller.

Conveniently, apparatus of this invention as described above may be arranged in combination with a copying machine to mark documents generated in the copying machine.

From another aspect the invention provides a copying machine in which information is reproduced on sheets fed along a path through the machine and incorporating means arranged along the path for automatically marking successive sheets fed therepast with mutually different colors in a preselected sequence. Although the marking means may be arranged at any position along the sheet path, it is conveniently arranged following the last processing station of the copier. For example, in the case of a xerographic copier in which toner is applied to the sheets in image configuration and then fused to the paper, the marking means is conveniently arranged between the fuser and the output tray.

The marking means may be operated under the control of the copying machine logic or it may be controlled for example through sensors arranged in the sheet path.

In order that the invention may be more readily understood, reference will now be made to the accompanying drawings, in which.

Figure 1:
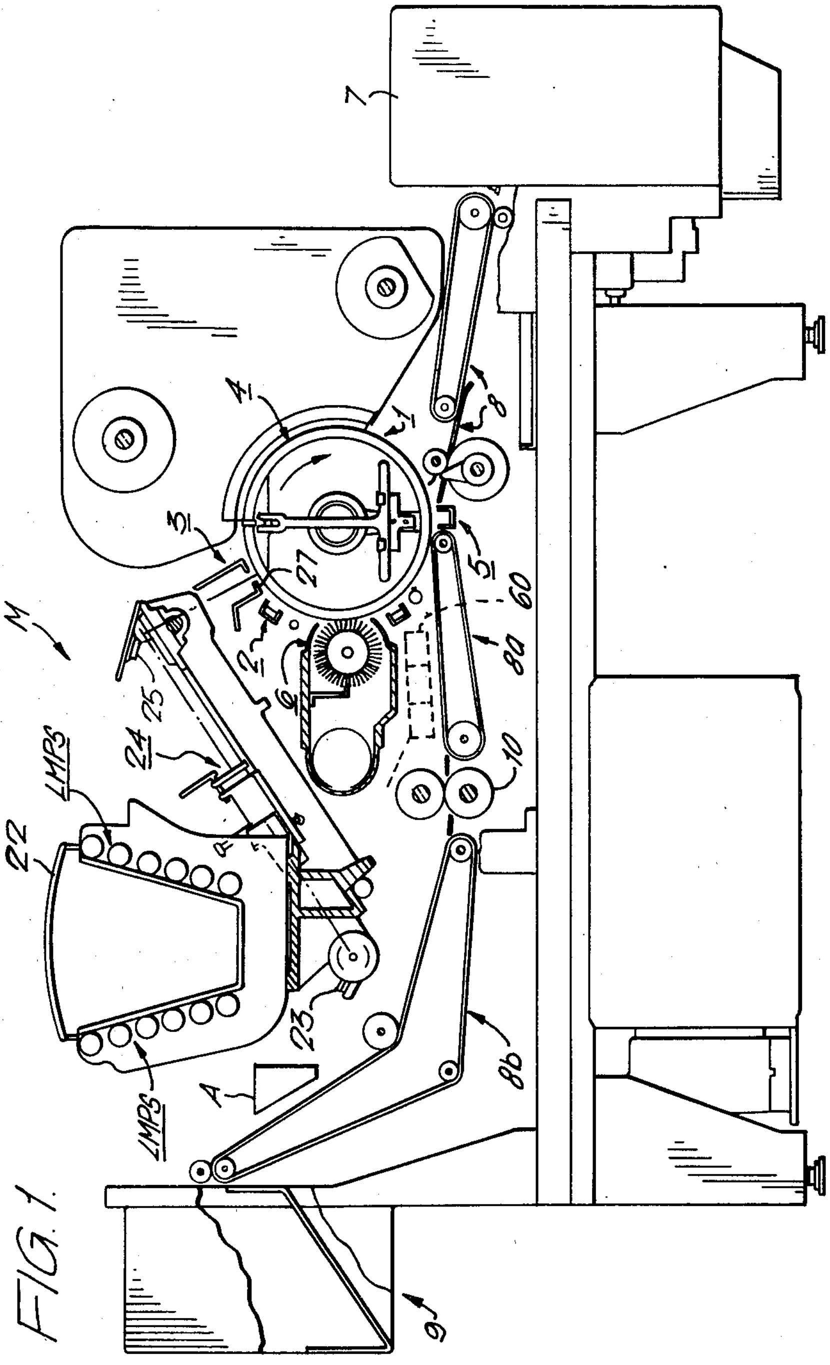
FIG. 1 is a schematic representation of an automatic xerographic reproduction machine in accordance with this invention.

Referring now to the drawings, FIG. 1 illustrates one embodiment of automatic xerographic reproduction machine in accordance with the invention generally indicated by the reference M incorporating apparatus for color-coding documents which is schematically represented at A.

The automatic xerographic reproduction machine M includes a xerographic plate 1 having a photoconductive layer or photosensitive surface on a conductive backing and takes the form of a drum which is journalled in a frame for rotation in the direction indicated by the arrow to sequentially pass a series of xerographic processing stations. For the purpose of the present disclosure, the several xerographic processing stations in the path of movement of the plate may be described functionally as follows:

A charging station 2 at which a uniform electrostatic charge is deposited on the photoconductive plate 1.

an exposure station 3 at which a light or radiation path of an image to be reproduced onto the plate surface to dissipate the charge in the exposed areas thereof to form a latent electrostatic image on the plate.

A developing station 4 at which xerographic developer material, including toner particles having electrostatic charge opposite to that of the latent electrostatic image, is presented to the plate surface whereby the toner particles adhere to the latent electrostatic image to form a toner powder image in configuration of the image being reproduced.

A transfer station 5 at which the toner powder image is electrostatically transferred from the plate surface to a transfer material or a sheet of final support material such as paper. As shown, copy paper is fed in sheet form from a supply arranged in housing 7 by the sheet transport system 8. Following transfer the copy sheet is fed away via a fusing station 10 at which the toner is fused to the paper to form a permanent image, to an output tray 9 by continuations 8*a* and 8*b* of the sheet transport 8.

A drum cleaning and discharge station 6 at which the plate surface is brushed to remove residual toner particles remaining thereon after image transfer and exposed to a relatively bright light source to effect substantially complete discharge of any residual electrostatic discharge remaining thereon.

In operation of the xerographic processor, the xerographic drum 1 is rotated and a document carrying an image to be reproduced and arranged on a platen is scanned incrementally at a rate such that the optical image is projected onto the drum through a slit 27 at a predetermined rate relative to the rotational speed of the drum. The optical scanning or projection system disclosed herein projects a flowing image onto the surface of the photoconductive drum from a stationary original. The optical scanning or projection assembly includes a transparent curved platen member 22 adapted to support a document to be reproduced, the document being uniformly illuminated and arranged in light projection relation to the moving light-receiving surface of the xerographic drum. Uniform lighting is provided by banks of lamps LMPS arranged on opposite sides of the platen. Scanning of the document on the stationary platen is accomplished by means of a mirror assembly which is oscillated relative to the platen in timed relation to the movement of the xerographic drum. The mirror assembly, which includes an object mirror 23, is mounted below the platen to reflect an image of the document through a lens unit 24 onto an image mirror 25 which, in turn, reflects the image onto the xerographic drum through the slit 27 in fixed light shield 26 positioned adjacent to the xerographic drum surface.

The machine M may incorporate an automatic overlay device such as described in U.K. patent specification Nos. 1,206,633; 1,265,736 and 1,274,897, in which an elongated generally transparent overlay web having various separated areas of opaque indicia thereon is sandwiched between two generally parallel platen glasses, an original indicia bearing document being positioned stationary on the upper platen glass and the overlay web sequentially moved to superimpose itself between the document and the copying machine optics to add to or effectively subtract information from the document being copied.

Figure 2:
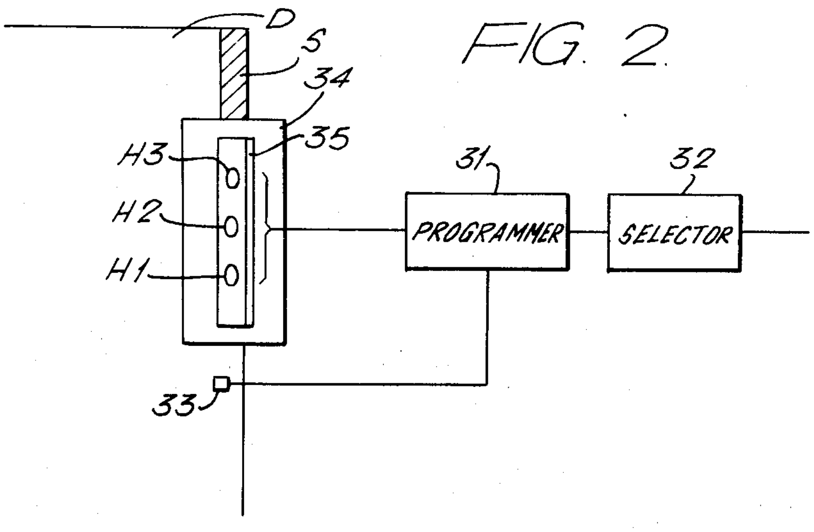
FIGS. 2 and 3 are schematic representations of one embodiment of color-coding apparatus suitable for use in the machine of FIG. 1.
Figure 3:
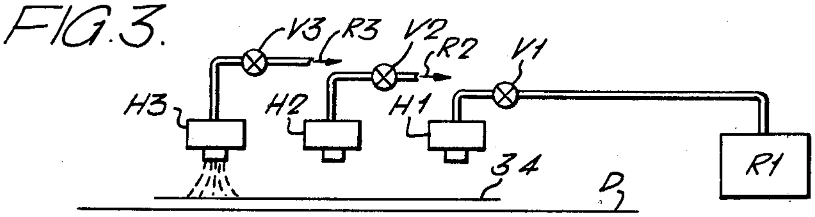

Referring now to FIGS. 2 and 3 there is illustrated an embodiment of document color-coding apparatus A in accordance with this invention suitable for use in the xerographic reproduction machine M shown in FIG. 1. The apparatus includes three spray heads H1, H2, H3, connected through supply lines to respective containers R1, R2, R3, e.g. aerosol containers, containing liquid marking materials, e.g. dyes, of mutually different colors, under pressure. The dyes are of the three primary colors with red dye in container R1, yellow dye in R2 and blue dye in R3. Flow of marking material to the spray heads is controlled by valves V1, V2, V3, provided in the lines leading to heads H1, H2, H3, respectively.

The valves V are solenoid operated in response to signals from a programmer 31. A sensor, e.g. a photocell 33 is provided to sense the leading and preferably also the trailing edge of each document for determining the length of each burst of spray and thus keep wastage to a minimum. A mask 34 having an elongated slot 35 is arranged between the spray heads H and a document D fed therepast so as to form a uniformly wide stripe along the edge of the document. Preferably the slot 35 overlaps the edge of the document D so that the dye will cover the edge of the document; thus when the document is in a stack, its color-coding can still be seen.

In operation, as each successive document of a series is fed along the conveyor 8*b* past the spray heads H, one or more of the valves V is opended by a signal from the programmer 31 to apply the document a stripe S of dye of a preselected color depending upon the position of the document in the series. Each document will usually be marked with a different color than any other document in the series, although in some circumstances it may be that plural documents in a series will need to be marked with the same color. It is further to be understood that in some cases, one (or more) documents in a series may not be marked at all, the paper stock used for all the documents itself providing the necessary recognition feature for that document. The use of primary colors for the dyes permits a wide range of colors to be applied by operating the sprays H singly and in combination.

The programmed sequence is preferably variable by a simple manual operation such as push-button selector 32. This should preferably permit the colors themselves and also their order and the number of them in a series to be varied.

One example of a program for a series of five documents such as an invoice is as follows:

First Copy (Customer's copy). No color-coding applied.

Second Copy (Accounts Department). Valve V1 opended to apply red stripe. Valves V2 and V3 closed.

Third Copy (Sales Department). Valve V2 opended to apply yellow stripe. Valves V1 and V3 closed.

Fourth Copy (Despatch Department). Valve 3 opended to apply blue stripe. Valves V1 and V2 closed.

Fifth Copy (File Copy). Valves V2 and V3 opended to apply green stripe. Valve V1 closed.

Color-coding as provided by this invention has wide application. A few of its uses are suggested below:

1. Departmental Coding—invoices, accounts, dispatch, manufacturing group etc.
2. Priority Coding—red stripes for urgent memos etc. green stripe for least urgent etc.
3. Security Classification—Postal class, first, second, parcel, airmail, personal information, research detail etc. executive copies.
4. Secure Document Creation—Only copies created by official source color-coded. Color equivalent to signature.
5. Sections of books and catalogues—Color-coded index, price list and categories.
6. Data Codes—Colors rotated each month, quarter or year. Telephone directories, price lists, insurance forms, timesheets etc.
7. Notices—Social club, safety, canteen notices, striped top and bottom to attract attention etc.

8. Enhancement of Logos—Company name in black brightened up with color stripe.

9. Progress Coding—Document creation using overlays as goods pass through a factory. Original held in central location. Each department creates the next department's color-coded progress copy.

10. Issue Numbers—Codes indicate draft, final and modified issues of drawings, handbooks, specifications etc.

11. Routing and Action—Stripes of two different colors provided along top and bottom edges to indicate different functions such as routing for one and action for the other.

Several further ways of applying a liquid marking material will now be described with reference to FIGS. 4 and 5.

Figure 4:
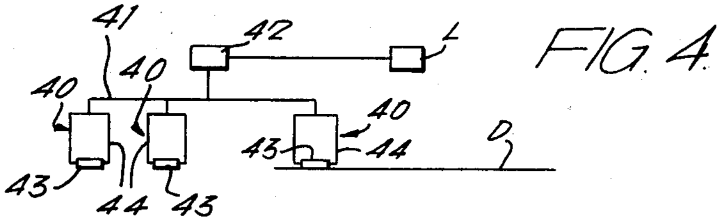
FIG. 4 is a schematic representation of a second embodiment of color-coding apparatus.

In the embodiment of FIG. 4 three marking devices 40 are mounted on a carousel 41 and a drive 42 operated under the control of a copying machine logic L serves selectively to position the devices 40 in the path of a document D fed therepast (into the paper as seen in FIG. 4.) The marking devices shown take the form of absorbent, e.g. felt, pads 43 arranged in the mouths of reservoirs 44 each containing a differently colored ink.

Instead of the felt pads illustrated, the marking devices may take the form of inked printing rollers dipping in suitable ink reservoirs.

Figure 5:
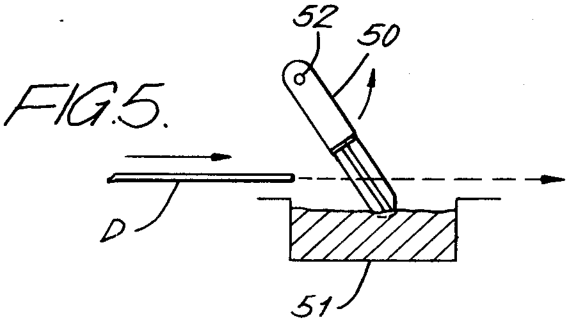
FIG. 5 is a schematic representation of a third embodiment of color-coding apparatus.

In FIG. 5, a marking brush or pad 50 which noramally dips in an inkwell 51 is pivotally mounted at 52. As shown, the brush is lifted from the inkwell by the passage of the paper and then returns to the inkwell. Plural devices 50 may be mounted on a carousel in the manner shown in FIG. 4.

In the embodiment of FIGS. 2 and 3 instead of the spray devices described, individual aerosol cans operated by solenoid plungers may be used.

Solid marking devices may be used in place of the liquid marking devices which have been described. For example, the devices 40 of FIG. 4 may be replaced by crayons formed for example by xerographic toner particles suspended in a wax.

Another possibility is to apply microspheres of the desired color characteristics to the document and crush them into the paper using a roller or a heated fuser roller as in the fuser 10 of FIG. 1. To this end microspheres of different color characteristics may be selectively dispensed from a multi-compartment dispenser 60 (FIG. 1) arranged in the copier ahead of the fuser station.

In another embodiment, electrochromic paper may be used as the support material for the documents and the desired different colors imparted to the document by applying suitable selected potential differences to the paper.

While particular embodiments of the invention have been described it will be realized that various modifications may be made without departing from the scope of the invention as defined in the appended claims. For example although in the embodiment of FIGS. 2 and 3, the spray heads are arranged in line to provide a color mix when two or three heads are operated together, the heads may be arranged side-by-side to provide-multicolor stripes if so desired. Further, if desired, additional spray heads may be provided along the opposite edge and/or the opposite face of the document. Where plural stripes are provided, they may differ in color and purpose. For example, one stripe may indicate the recipient of the document while another indicates the manner of delivery or function of the document.

In each of the embodiments described herein more or less marking devices (colors) may be provided as desired.

Although the invention has been described with particular reference to a copying machine, it is to be understood that the color-coding apparatus of this invention may constitute a separate unit which may be entirely self-contained.

Various other forms of marking device for applying marking material in accordance with this invention may be employed in addition to those described above. For example, a brush of generally cylindrical form having bristles extending radially and dipping into an inkwell may be rotated past a bar which flicks the bristles as they move therepast to throw ink from the bristles towards a document fed therepast. In another form liquid marking material is flowed from a selected container of a bank of such containers on to a rotating paddle wheel or fan which directs the marking material against a document fed therepast. If desired a mask or guide may be provided to control the area of coverage to the document.

While this invention is particularly suitable for applying different colors to different ones of a series of documents, in a modification of this invention a single marking device is provided for marking all or selected documents fed therepast with the same color code. Two such devices may operate on the same documents in tandem.

In accordance with another modification, a marking device of this invention may be programmed automatically to vary the size (e.g. length of a stripe) of the area marked from one copy to the next.

In a further modification, marking material, particularly liquid marking material, may be applied to the document through a stencil. For example, in the embodiment of FIGS. 2 and 3 the mask may be a stencil in the form of an endless belt which moves at the same speed as the document.

The term "color" used herein and in the claims includes black and white.

What is claimed is:

1. Apparatus for color-coding documents including means for automatically marking successive documents serially presented thereto with mutually different colors in a preselected sequence, wherein said marking means includes a plurality of marking devices operable in the preselected sequence, wherein each said device is loaded with a different color marking material, said marking devices to be operated singly and in combination to produce a range of colors.

2. Apparatus according to claim 1, in which said preselected sequence is variable.

3. Apparatus according to claim 1 in which documents to be marked are fed past the marking means and the latter serves to mark a document with one or more stripes.

4. A copying machine in which information is reproduced on sheets fed along a path through the machine including means arranged along said path for automatically marking successive sheets fed therepast with mutually different colors in a preselected sequence, wherein said marking means includes a plurality of marking devices operable in the preselected sequence, wherein each said device is loaded with a different color marking material, said marking devices to be operated singly, and in combination to produce a range of colors.

5. Apparatus according to claim 1, in which said marking means comprises three said marking devices loaded with the marking materials of the primary colors of red, blue and yellow.

6. Apparatus according to claim 4, in which said preselected sequence is variable.

7. Apparatus according to claim 4, in which said marking means comprises three said marking devices loaded with the marking materials of the primary colors of red, blue and yellow.

8. Apparatus according to claim 4 in which documents to be marked are fed past the marking means and the latter serves to mark a document with one or more stripes.

9. Apparatus according to claim 4, in which said marking means comprises a spray device.

10. Apparatus according to claim 4, in which said marking means comprises a liquid coated absorbent pad.

11. Apparatus according to claim 4, in which said marking means comprises ink printing rollers that dip into suitable ink reservoirs while in the non-marking mode.

12. Apparatus according to claim 4, in which said marking means comprises a brush that dips into an inkwell while in the non-marking mode.

13. Apparatus according to claim 4, in which said marking means comprises a solid material marking device.

* * * * *